United States Patent [19]

Tam

[11] Patent Number: 5,447,586
[45] Date of Patent: Sep. 5, 1995

[54] CONTROL OF THERMOPLASTIC TOW PLACEMENT

[75] Inventor: Albert S. Tam, Hockessin, Del.

[73] Assignee: E. I. Du Pont de Nemours and Company, Wilmington, Del.

[21] Appl. No.: 273,684

[22] Filed: Jul. 12, 1994

[51] Int. Cl.[6] .......................................... B65H 81/00
[52] U.S. Cl. ................................ 156/64; 156/169; 156/173; 156/175; 156/359; 156/425; 156/428; 156/429; 156/441; 156/433; 156/523; 156/573
[58] Field of Search ............... 156/169, 64, 172, 173, 156/175, 359, 425, 368, 378, 428, 429, 433, 441, 523, 573

[56] References Cited

U.S. PATENT DOCUMENTS

| | | | |
|---|---|---|---|
| H1,261 | 12/1993 | Gibson et al. | 156/425 X |
| 3,313,670 | 4/1967 | Sherwood | 156/425 X |
| 4,990,213 | 2/1991 | Brown et al. | 156/425 |
| 4,992,133 | 2/1991 | Border | 156/429 X |
| 5,039,368 | 8/1991 | Gunyuzlu | 156/429 X |
| 5,078,592 | 1/1992 | Grimshaw et al. | 156/359 X |
| 5,160,568 | 11/1992 | Gruber | 156/429 X |
| 5,266,139 | 11/1993 | Yokota et al. | 156/169 |

FOREIGN PATENT DOCUMENTS

| | | | |
|---|---|---|---|
| 0463611A2 | 1/1992 | European Pat. Off. | |
| 0491355A1 | 6/1992 | European Pat. Off. | |
| 0534092 | 3/1993 | European Pat. Off. | 156/175 |

*Primary Examiner*—Jeff H. Aftergut

[57] ABSTRACT

A control architecture involves two control loops, one for controlling heat input to a moving composite structure and the other controlling the speed of the structure to control quality of the product being formed. Since velocity and heat input affect the temperature of the composite there is cross coupling between the control loops so that either or both can be used to control the temperature. Preferably the invention uses the velocity or speed of the composite as the primary control, i.e., the controller automatically seeks the proper laydown velocity for the current heat input. If the energy source is not providing sufficient heat, the process slows down until the proper temperature is reached. This ensures that the composite material passing through the process is always at the proper temperature.

5 Claims, 3 Drawing Sheets

CONTROL OF THERMOPLASTIC TOW PLACEMENT

BACKGROUND OF THE INVENTION

This invention relates to placement and in-situ consolidation of polymer coated multifilament fiber tows in tow placement processes for manufacturing composite parts, and more particularly, it relates to controlling the placement process for manufacturing composite parts of irregular geometry at high throughputs.

U.S. Pat. No. 5,160,568 discloses filament winding of fiber-tow whereby the tow is preheated, tensioned and deposited on a cylindrical mandrel to form composite parts of regular geometry. A published European application EP-0 463 611 A2 discloses the use of a hot shoe and a chilled compaction roller which provides improved degree of consolidation in filament winding on cylindrical mandrel.

EP-491 355-A1 European Publication discloses placement of polymer coated fiber-tows on mandrels having irregular sections and a computer controlled process which employs the use of a hot air-gun which heats the contact area prior to compaction and a computer-model which calculates air flow rate and air temperature needed to maintain a pre-set temperature of the contact area. Although this disclosure discloses a computer controlled process for producing of fiber-reinforced composite parts having irregular geometry, it suffers from the sluggish response of the air-gun heat source and, consequently, it can not maintain the temperature of the contact area at the desired value when the fiber-tow suddenly accelerates or decelerates with the changing geometry, particularly, when the process is run at high speeds, i.e., above 20 ft/min. This results in non-uniform or poor consolidation of the composite part or limits operation of the process to extremely low throughputs.

For optimum feasible low-cost operation, it is desirable that the in-situ consolidation process has a fast heat transfer response to accomodate rapid changes in tow velocity so that the process can be operated at highest possible throughputs.

SUMMARY OF THE INVENTION

According to the present invention, a high throughput process has been devised which employs a gas torch capable of providing fast response with the manipulation of gas flow-rate, a hot-shoe, a conformable chilled compaction roller and a novel computer control architecture for controlling the process.

The control architecture has two main control loops. The primary loop adjusts the tow velocity to control temperature at the contact area. The secondary control loop then adjusts the gas flow rate of the torch to increase the tow speed to the maximum without making the process unstable or operating the process outside of constraints imposed on velocity or temperature. The manipulation of tow velocity allows extremely fast response to temperature change which in turn allows higher operating speeds without losing good consolidation of the composite parts. An optional third control loop is also provided which allows adjustment of compaction pressure on the chilled roller.

As described below, this invention allows stable operation of a process for building and consolidating a composite structure from a tow of thermoplastic resin reinforced with fibers that includes the steps of advancing the tow to a laydown location on the structure at a relative velocity by means of a rotating mandrel and moving delivery head, heating the structure and tow at the laydown location by means of an energy supplied heating source to a temperature above the melt but below the degradation temperature of the thermoplastic resin to ensure molten mating surfaces at the laydown location, and applying force to the tow at said laydown location by means of a heated shoe and a cooling roller, a method for controlling said temperature at the laydown location and the relative velocity of said delivery head to the rotating mandrel comprises: sensing the temperature at the laydown location; comparing the temperature at the laydown location to a predetermined set point temperature; generating a first signal proportional to the difference between the temperature at the laydown location and the predetermined set point temperature; generating a second signal proportional to the energy supplied to the heating source; changing the said relative velocity in accordance with said first and second signals while simultaneously sensing said relative velocity at said laydown location; comparing said relative velocity at said laydown location with a predetermined set point velocity; generating a third signal proportional to the difference between the said relative velocity at the laydown location and the predetermined set point velocity; and changing the energy supplied to the first heating source in accordance with said third signal and the predetermined set point velocity.

The control method provides uniform part quality despite the transient nature of the process wherein the velocity and the temperature can vary over the course of time in winding the product. More particularly, the control architecture was predicated on the following functional relationship based on heat transfer analysis:

$$\Delta T = KqV^{-n}$$

wherein:
- $\Delta T$ is the critical temperature rise in the composite structure.
- K is a gain incorporating the composite structure thermal properties and the heat transfer coefficients of the actual hardware.
- q is the energy flux (or gas flow)
- V is laydown velocity of the tow
- n is a power law coefficient Values for K and v were determined empirically for the placement process hardware and material system being used. The above stated relationship forms the basis of a feed forward component of the controller and is also used to modify the linear control techniques used in the feed back component.

A key unique feature of the control architecture is cross coupling of the control loops to ensure product quality. Since both tow laydown velocity and gas flow affect the temperature change either or both can be used to control temperature.

Prior art techniques manipulated the energy source only. The drawbacks of this approach is that the energy source may not respond quickly enough to prevent large temperature swings, and worst, the process can outrun the ability of the energy source to provide heat.

The invention uses the laydown velocity of the tow as the primary control, i.e., the controller automatically seeks the proper laydown velocity for the current heat input and heat transfer properties of the process. If the energy source is not providing sufficient heat, the process slows down until the proper temperature is reached, stopping if necessary. This ensures that the material passing through the process is always at the proper temperature.

The energy source is simultaneously manipulated to drive the process to its maximum rate determined by:
(1) operator setting of maximum laydown rate; and
(2) instantaneous capability of tow placement machine determined by machine kinematics The instantaneous "laydown rate" set point is the minimum of (1) and (2) above. Together the intermediate control level loops automatically adjust the process to achieve maximum throughput while maintaining proper process temperatures.

DETAILED DESCRIPTION OF THE ILLUSTRATED EMBODIMENT

Figure 1:
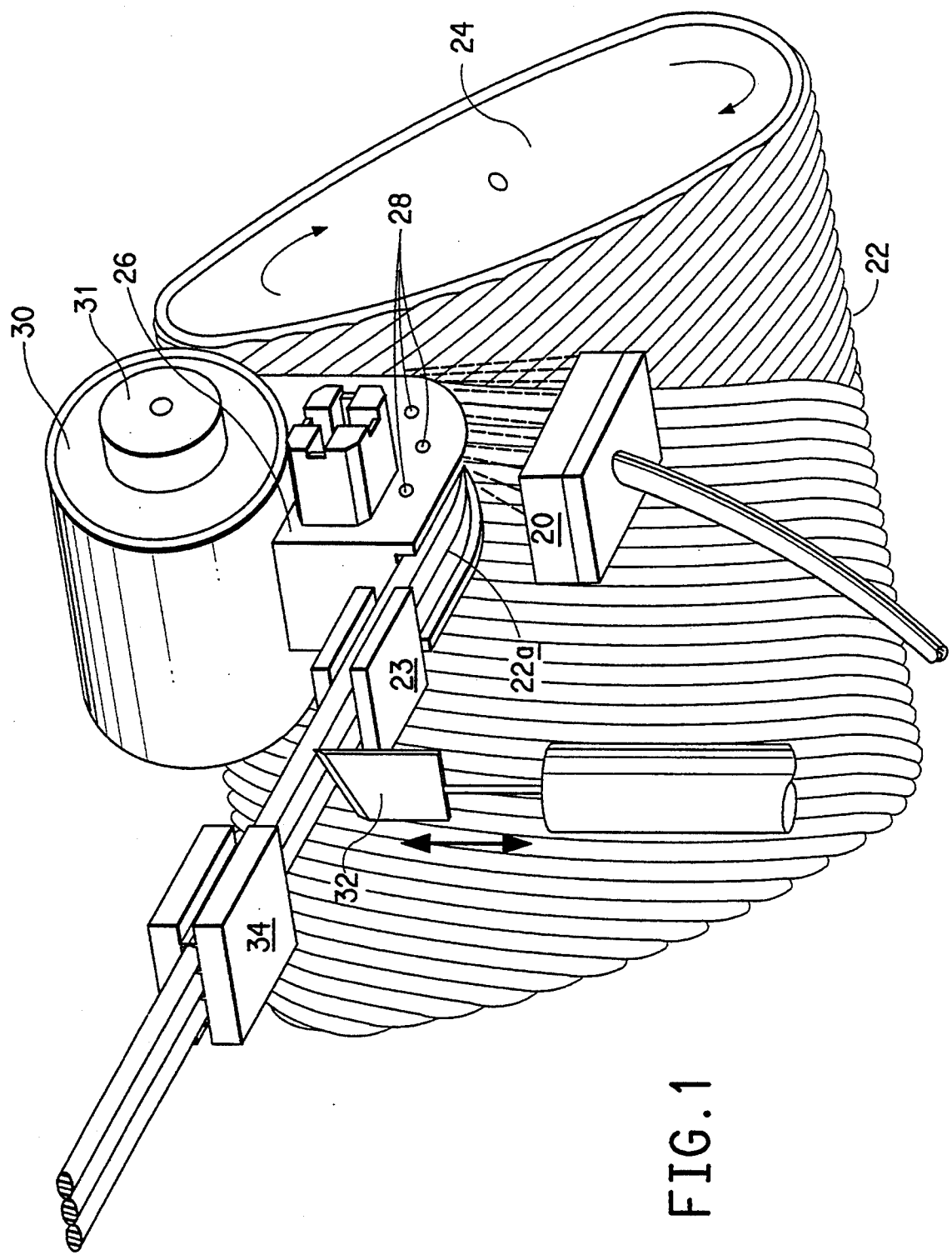
FIG. 1 is a perspective view of the apparatus useful in practicing this invention.
Figure 2:
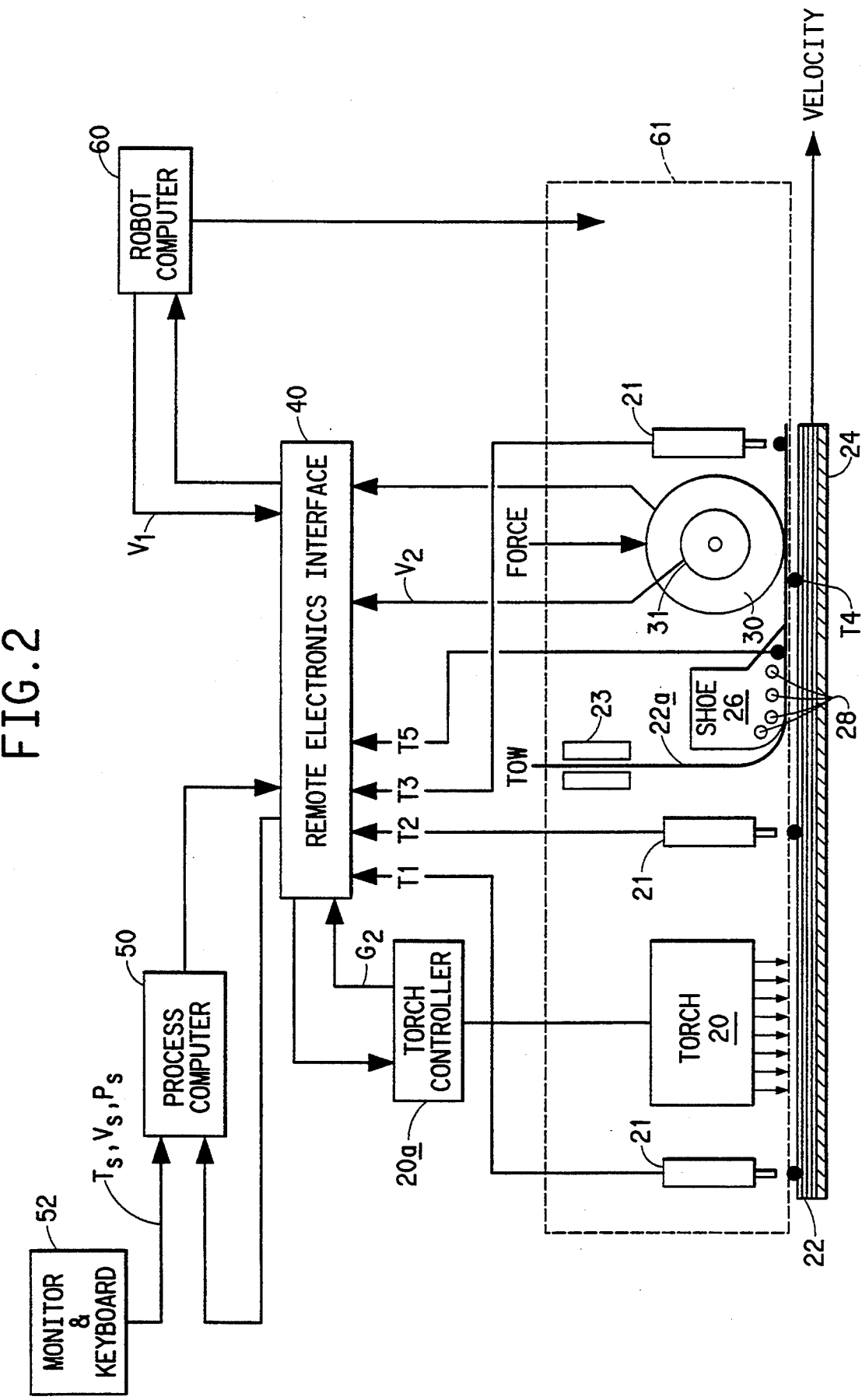
FIG. 2 is a schematic of the apparatus of FIG. 1 showing control components associated with the apparatus for controlling the process of this invention.
Figure 3:
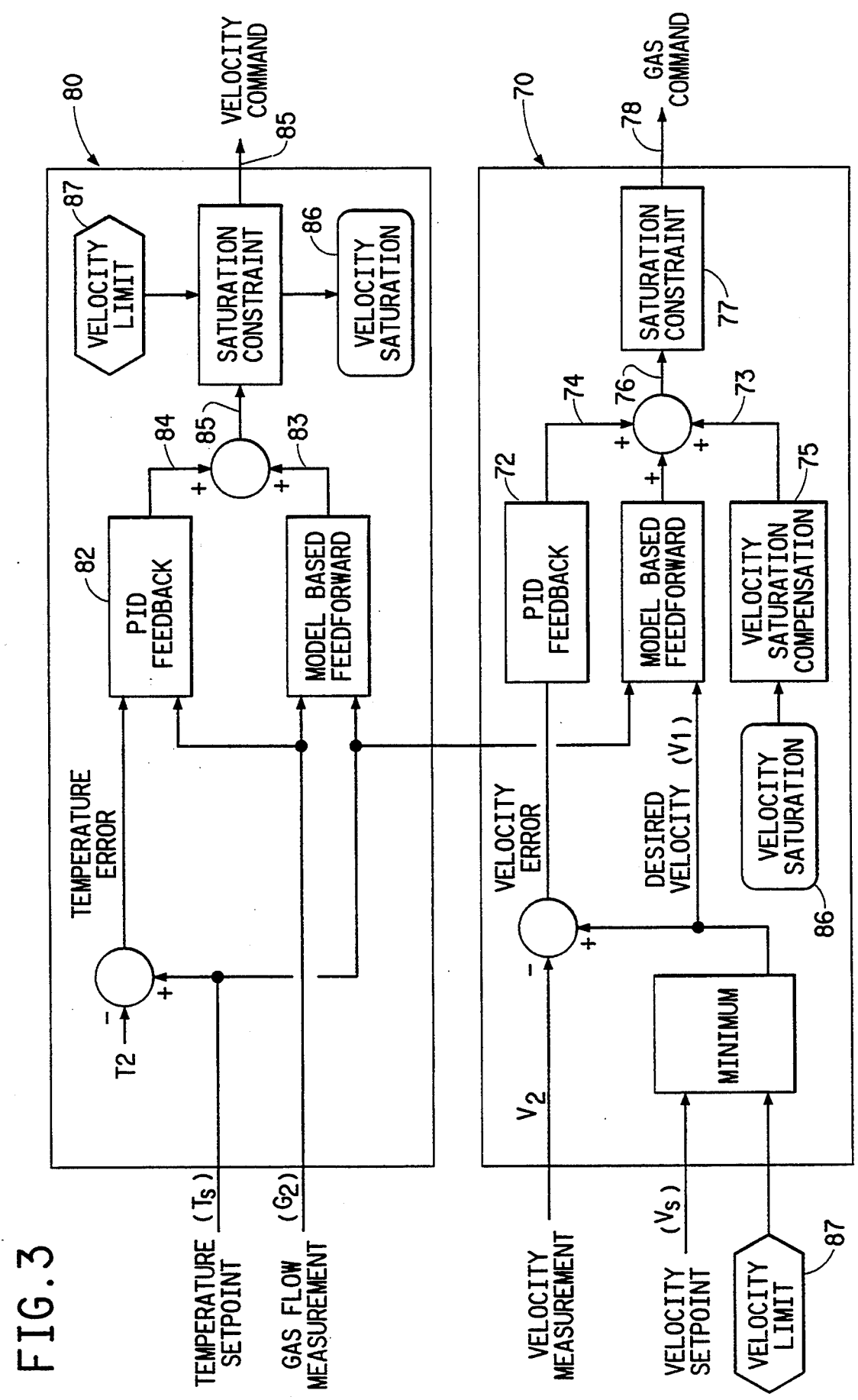
FIG. 3 is a block diagram representing a primary and a secondary control loop, for software signal flow inside the process computer.

FIGS. 1-3 show the relationship of the various components of the apparatus for placement and in-situ consolidation of polymer coated multifilament fiber tows. More particularly, a gas torch 20 (i.e., a first heating source) heats the surface layers of polymer coated tow 22 on the mandrel 24. The mandrel is shown having an out-of-round shape which results in variable velocity for the tow as it is laid down on the mandrel. IR heaters 23 preheat the tow 22a, guide shoe 26 heated by electrically energized cartridge heaters 28 provides additional heat to the tow as it moves to the mandrel to prevent excessive cooldown. The guide shoe 26 also presses the tow 22a against the mandrel and smooths it. A compaction roller 30 applies force to the incoming layer of tow 22a and cools it to freeze the tow 22a during laydown with layers of polymer coated tow 22, fussing them together. A cutter 32 is positioned upstream of heated shoe 26. A die 34 guides the tow and aligns it to the correct path. The torch 20, the IR heaters 23, the hot guide shoe 26, and the compaction roller 30 are all mounted to a robot tow placement head represented by the box outlined dashed lines 61 encompassing these elements (FIG. 2).

FIG. 2 schematically shows the physical signal flow among process hardware components. A remote electronics interface 40 serves as a common bus for signals to be shared and routed among the various hardware components. A torch controller 20a controls gas flow to the torch 20 as well as ignition of the gas flowing from the torch. A process computer 50 sends commands to the torch controller 20a and the robot controller 60 via the interface 40.

The process signals required for the control system of this invention include:

$T_1$—a signal generated by a pyrometer 21 representing the surface temperature of the tow substrate 22 as the tow enters beneath the torch 20.

$T_2$—a signal generated by a pyrometer 21 representing the surface temperature of the tow 22 substrate laid down on mandrel 24 as the tow substrate exits from beneath the torch 20.

$T_3$—a signal generated by a pyrometer 21 representing the surface temperature of the tow 22a as the tow moves beyond the compaction roller 30 on the mandrel 24.

$T_4$—a signal representing the surface temperature of the tow 22a as the tow leaves the guide shoe 26.

$T_5$—a signal representing the temperature of the guide shoe 26.

$G_2$—a signal representing gas flow rate or the amount of gas flowing to the torch as measured within torch controller 20a.

$V_2$—a signal representing the instantaneous process laydown velocity as measured by tachometer 31 attached to compaction roller 30.

$V_1$—a signal representing maximum velocity achievable by the robot due to kinematic constraints updated continuously by the robot computer 60.

A keyboard 52 is attached to computer 50 and the following settings are entered by the user or operator to the computer by means of the keyboard:

$T_s$—temperature set point, the desired temperature exiting the torch 20.

$V_s$—velocity set point, the maximum rate of laydown of the tow 22a.

$P_s$—desired consolidation pressure applied by compaction roller 30.

FIG. 3 shows the software signal flow inside the process computer 50 (e.g. Dell Dx/50M). The two control loops 70 and 80 take the user defined setpoints and the process signals and calculate commands for the gas flow and velocity, respectively.

The first loop 80 manipulates the velocity to maintain the process temperature at the user defined temperature setpoint $T_s$. The measured temperature $T_2$ is subtracted from the temperature setpoint $T_s$ to generate a temperature error. The temperature error is fed into a modified PTD feedback controller 82 together with the gas flow measurement $G_2$ to calculate the first component of the velocity command. The temperature setpoint $T_s$ and the gas flow $G_2$ measured are fed into a model based feedforward calculation (equation 1) to calculate the second component of the velocity command. The first 83 and second 84 components of the velocity command are added together to produce a desired velocity command 85. This desired velocity command is compared with a user set lower limit 86 and the time varying upper limit 87 received from the robot computer 60. The upper limit appears in both the first and second loops and is shown separately, though the signal is identical. If the desired velocity command is within limits, the velocity command equals the desired value and is sent out to the robot computer via the remote electronics interface. The velocity saturation signal 86 is set to zero. If the desired velocity command is above the upper limit, the velocity command is set to the upper limit, and a velocity saturation signal is calculated as the desired velocity command 85 minus the upper limit. If the desired velocity command is below the lower limit, the velocity command is set to the lower limit, and a velocity saturation signal is calculated as the desired velocity command 85 minus the lower limit. The calculated velocity saturation value 86 is sent to the second loop 70, but is not shown directly connected.

The second loop 70 manipulates gas flow to achieve the desired laydown rate. The desired velocity is the minimum of the velocity limit 87 received from the robot computer and the user set velocity setpoint $V_2$. The velocity measured ($V_s$) is subtracted from the desired velocity ($V_1$) to generate a velocity error, which is fed into a PID controller 72 to calculate the first component 74 of the gas command. The desired velocity and the temperature setpoint are fed into a model based feedforward calculation (equation 1) to calculate the second component of the gas command. The velocity saturation 86 from the first loop is fed into a velocity saturation compensation calculation to calculate the third component of the gas command.

All three components of the gas command are added together to form the desired gas command 76. The desired gas command is constrained in 77 to the gas flow permitted by the torch controller i.e. by gas command 78 before being sent out to the torch controller.

The PID controllers and the model based feedforward calculations were all implemented in software. The model based feedforward calculations make use of the heat transfer model described above which relates the gas flow, laydown velocity, and temperature rise. Parameters in the heat transfer were empirically determined on the actual process hardware. The PID loop parameters were tuned using software simulations incorporating these empirically determined model parameters.

What is claimed is:

1. In a method for building and consolidating a composite structure from a tow of thermoplastic resin reinforced with fibers that includes the steps of advancing the tow to a laydown location on the structure at a relative velocity by means of a rotating mandrel and moving delivery head, heating the structure and tow at the laydown location by means of an energy supplied heating source to a temperature to ensure molten mating surfaces at the laydown location, and applying force to the tow at said laydown location by means of a heated shoe and a cooling roller, a method for controlling said temperature at the laydown location and the relative velocity of said delivery head to said rotating mandrel comprising: sensing the temperature at the laydown location; comparing the temperature at the laydown location to a predetermined set point temperature; generating a first signal proportional to a difference between the temperature at the laydown location and the predetermined set point temperature; generating a second signal proportional to the energy supplied to the heating source; changing the said relative velocity in accordance with said first and second signals while simultaneously sensing said relative velocity at said laydown location; comparing said relative velocity at said laydown location with a predetermined set point velocity; generating a third signal proportional to a difference between the said relative velocity at the laydown location and the predetermined set point velocity; and changing the energy supplied to the heating source in accordance with said third signal and the predetermined set point velocity.

2. The method of claim 1 wherein the predetermined set point velocity varies over time.

3. The method of claim 1 wherein the predetermined set point temperature varies over time.

4. The method of claim 1 wherein both the predetermined set point velocity and temperature vary over time.

5. The method of claim 1 wherein the energy supplied heating source is a gas torch.

* * * * *